2 Sheets—Sheet 1.

A. DRESSELL, E. H. & J. G. VOTH.

Assignors by mesne assignments, to D. DRESSELL & C. W. VOTH.

Head-Light for Locomotives.

No. 8,447. Reissued Oct. 8, 1878.

Witnesses.
J. J. Philbrick
J. H. Lapham

Inventors.
A. Dressell
E. H. & J. G. Voth
Per Burroughs & Co
attys.

N. PETERS, PHOTO-LITHOGRAPHER, WASHINGTON, D. C.

2 Sheets—Sheet 2.

A. DRESSELL, E. H. & J. G. VOTH.

Assignors by mesne assignments, to D. DRESSELL & C. W. VOTH.

Head-Light for Locomotives.

No. 8,447. Reissued Oct. 8, 1878.

Witnesses.
J. J. Philbrick,
J. H. Lapham

Inventors.
A. Dressell
E. H. & J. G. Voth
Per Burridge & Co.
Attys

N. PETERS, PHOTO-LITHOGRAPHER, WASHINGTON, D. C.

UNITED STATES PATENT OFFICE.

ANDREW DRESSELL, ERNST H. VOTH, AND JOHN G. VOTH, OF CLEVELAND, OHIO, ASSIGNORS, BY MESNE ASSIGNMENTS, TO DORTHEA DRESSELL AND CHARLES W. VOTH.

IMPROVEMENT IN HEAD-LIGHTS FOR LOCOMOTIVES.

Specification forming part of Letters Patent No. 202,711, dated April 23, 1878; Reissue No. 8,447, dated October 8, 1878; application filed September 12, 1878.

*To all whom it may concern:*

Be it known that we, A. DRESSELL, E. H. VOTH, and J. G. VOTH, of Cleveland, in the county of Cuyahoga and State of Ohio, have invented new and useful Improvements in Head-Lights for Locomotives, of which the following is a description, reference being had to the accompanying drawings, making a part of this specification, in which—

Figure 1:
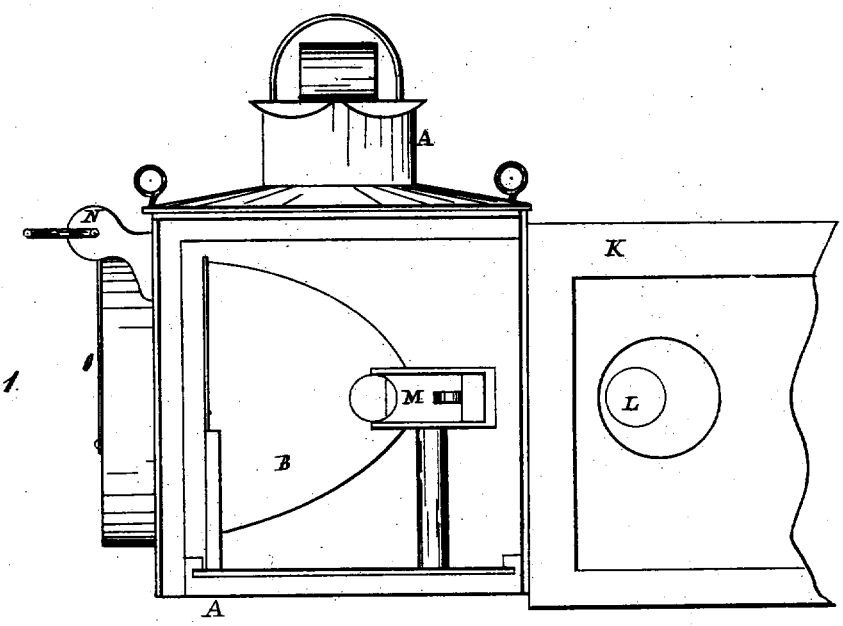
Figure 2:
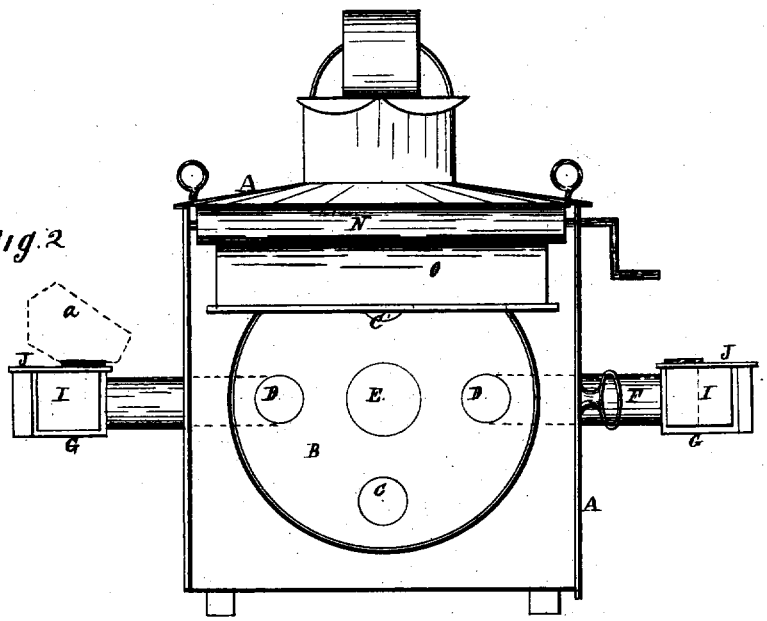
Figure 3:
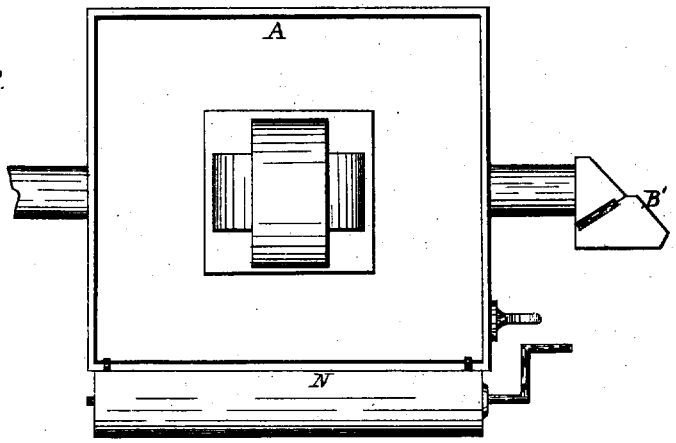
Figure 4:
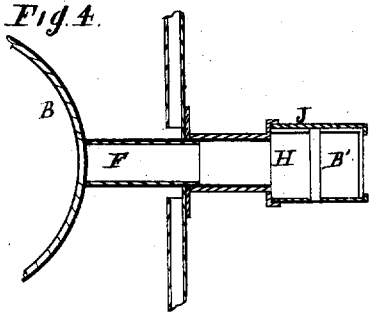
Figure 5:
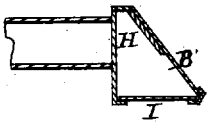

Figure 1 is a side view of the head-light with the door open. Fig. 2 is a front view. Fig. 3 is a plan view. Figs. 4 and 5 are detached sections.

Like letters of reference refer to like parts in the several views.

The nature of our invention in head-lights relates to the construction and arrangement of the side colored lights, termed "signal-lights," in combination with the main head-light, whereby the light from the reflector passes through tubes or openings into chambers wherein are mirrors or reflectors, upon which the light falls, and from which it is reflected through colored glass in front of the aforesaid chambers, so that colored lights can be seen for a long distance in front of the engine. These colored side lights or signal-lights are placed on each side of the head-light lantern, so that the light will pass directly through tubes or openings to the mirrors or reflectors in the chambers. The light illuminated from the head-light is sufficient to illuminate the signal colored lights for all purposes required. Furthermore, by this improvement a large amount of oil is saved, and the ordinary night-lanterns now used on each side of the front of the engine are dispensed with, the head-light being made to perform the duty of both in so far as the light may be concerned without any diminution of its strength.

A further improvement relates to a transparent curtain, so arranged in front of the head-light lantern that it may be rolled up or let down over the front or glass thereof, the object of which is to protect the light in case the glass of the lantern becomes broken, also to indicate that when the engine is on the side track and the curtain down the main track is clear for an approaching train.

For a more full and detailed description of the said invention reference will be had to the accompanying drawings and following specification.

In the drawings, A represents the lantern of the head-light, and B the reflector, (which may be of the usual construction,) to which are connected the improvements referred to.

The openings or holes C C′ in the reflector are for the lamp and its chimney, arranged in the usual way. In the sides of said reflector are holes or openings D D, arranged in line with the light of the lantern, supposing it to be at E; hence the radiating rays of light will pass directly from E to the openings D D, thence through said openings into the chambers G G, in which chambers are arranged reflectors, as seen at H, Figs. 4 and 5, at such an angle that the light from the lamp at E and reflector B is thrown from the reflectors H through the glass or lenses I, respectively, in front of the chambers, by which the side lights can be seen for a long distance from the engine.

The construction and arrangement of the several parts of the side-light mechanism and the connections with the reflector B are alike on each side of the head-light, thus allowing the light to pass directly from the reflector into the chambers, so that the light may be seen from the rear as well as from the front of the engine.

Access is had to the chambers through the top, of which J, Fig. 2, is the cover. The dotted lines *a* indicate that the cover is open.

Access is had to the head-light through the side door K, which, in Fig. 1, is represented as being open. That section of the tube projecting from the outside of the door is a trifle larger than that part thereof attached to the reflector B; hence on closing the door the ends of the two sections of tube will shut one over the other, the continuity of which is thereby maintained, as shown in Fig. 4. On opening said door the tube is separated, as seen in Fig. 1, in which L represents the end of the tube attached to the door, and which tube may be longer or shorter.

F is the tube from the reflector. M is a slide, whereby the light may be cut off from entering the chamber. N is a case containing a roller, whereon is wound a transparent curtain, O, shown as partially unrolled, and which may be so far unrolled as to cover the entire face of the head-light.

The purpose of the colored side lights, as above described, is for signaling as to the nature of the approaching train, whether it is a train running on time or a train running between the regular trains—as the local ones or way-trains. Said side lights are used for all the signaling purposes for which the two signaling-lights are used, and placed on each side of the front of the engine, requiring, as above said, two separate lamps; hence their use is attended by an additional expense of oil and time in caring for them. This expense is avoided by using the side lights herein described, as they borrow their light from the head-light, and that without diminishing its illuminating capacity, it not being interrupted by the side lights, but is thrown forward ahead of them upon the track.

Hitherto side lights have been used in connection with head-lights; but such lights have been sometimes placed so far forward and near the face of the head-light that their light is lost in the greater light from the main light; hence such side lights fail to be seen at any considerable distance in advance of the engine. Therefore such are of little practical value.

The side lights herein described avoid this objection, for the reason of their being placed so far back from the face of the head-light that their light is not lost in its greater blaze; hence they can be seen as far in advance of the engine as the ordinary lanterns alluded to.

Glass of different colors may be used in the side lights herein described—as the red and green, or other colors—as the nature of the signal to be given may require, and the light may be entirely shut off by the slides M.

In the event a train is standing on a side track, leaving the main line open for a coming train, the fact is made known by lowering the curtain O, thereby partially concealing the brightness of the head-light, but at the same time leaving the side lights in full glow, making known the fact that the track is clear, as aforesaid.

The curtain is also used to protect the glass from being broken by storms of hail, &c., and when broken it serves the purpose of a glass until repairs are made.

What we claim as our invention, and desire to secure by Letters Patent, is—

1. The chamber or chambers G G, reflectors H, glass face I, and glass back B, substantially in the manner as described, and for the purpose specified.

2. In locomotive head-lights, the reflector B, provided with side openings, in combination with one or more chambers, G G, each having a reflector and glass face and back, so that the light therein will be transmitted through said side openings into the chambers, and reflected therefrom in the manner substantially as described, and for the purpose specified.

3. In locomotive head-lights, a reflector having side openings therein, for the purpose set forth, in combination with the chambers G G, provided with a reflector and glass face and back, constructed substantially as described, and for the purpose specified.

ANDREW DRESSELL.
ERNST HEINRICH VOTH.
JOHN G. VOTH.

Witnesses:
J. H. BURRIDGE,
C. G. FORCE.